June 12, 1951 L. V. GUILD 2,556,757
GLASS CUTTING APPARATUS
Filed April 13, 1944 2 Sheets-Sheet 1

INVENTOR
*Lloyd V. Guild.*
BY
*Bernard L. Zanguill*
ATTORNEY

June 12, 1951 L. V. GUILD 2,556,757
GLASS CUTTING APPARATUS
Filed April 13, 1944 2 Sheets-Sheet 2
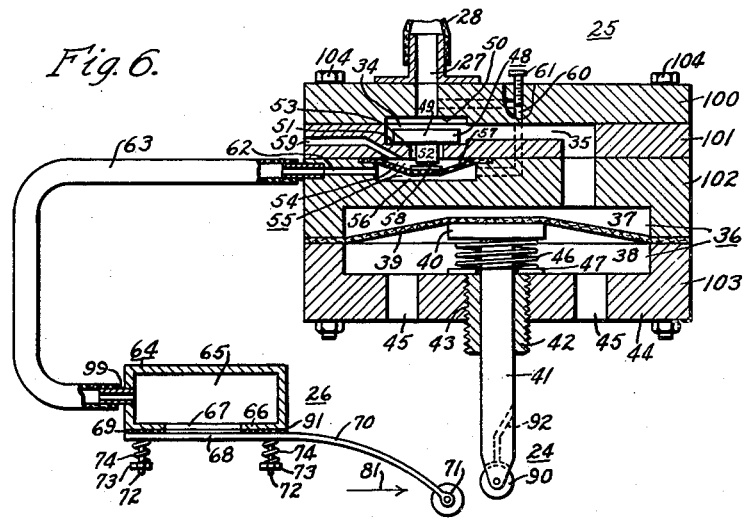
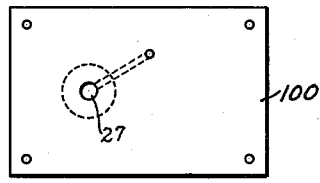
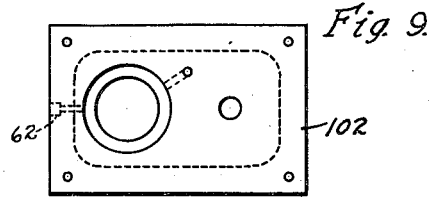
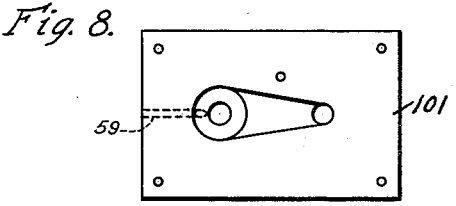
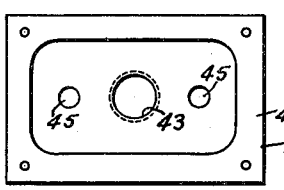
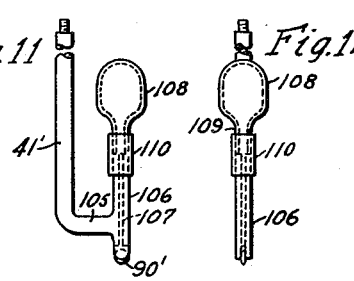
INVENTOR
*Lloyd V. Guild.*
BY
*Bernard L. Zangwill*
ATTORNEY Patented June 12, 1951

2,556,757

UNITED STATES PATENT OFFICE 2,556,757

GLASS-CUTTING APPARATUS

Lloyd V. Guild, Pittsburgh, Pa., assignor, by mesne assignments, of one-third to Bernard L. Zangwill, Hyattsville, Md.

Application April 13, 1944, Serial No. 530,785

13 Claims. (Cl. 33—32)

My invention relates to means for scoring larger glass sheets, lights and panes so that they can be broken into smaller pieces of glass. In a more particular sense, my invention is directed to improvements for semi-automatically or fully automatically making one or more straight-line cuts in a piece of glass or a plurality of pieces of glass.

It is a primary object of my invention to provide a machine that will cut a larger piece of glass into smaller panes of desired size with more accuracy and at a rate considerably in excess of that possible through hand operations alone.

One of the main accomplishments of my invention is a simple and cheap machine, devoid of complex parts, for low-cost production, in mass quantities, of small rectangular pieces of glass, such as are needed for welding masks, small instruments, and many other objects and purposes requiring pieces of glass much smaller than the standard commercial sizes now provided.

In general, my invention is directed to providing a glass-cutting machine specially devised for simplicity of construction and operation. A preferred form of my invention, in a basic or elemental form, comprises one or more suitably supported and spaced glass-cutters, conveyor means for rectilinearly successively moving pieces of glass underneath the cutter or cutters, and pneumatic pressing mechanism for applying a substantially constant force on each glass-cutter for automatically pressing it against the glass-pane thereunder, so as to score the moving glass-pane. The conveyor means is provided with special adjustable guides for properly positioning each glass-pane being scored. The pressing mechanism acts resiliently to assure an even cut and to accommodate for any unevenness in the flatness of the glass, and may include means for adjusting the force with which it presses each cutter on the glass, so that a smooth light cut, not heavier than required, can always be obtained. The pneumatic pressing mechanism is constructed so as to be easily controlled by an external control to which it responds for applying a cutting force to the glass-cutter. The control is responsive to the position of a traveling glass-pane, and can be adjusted to take care of any lag from the time a control operation is initiated to the start of a cutting operation of the glass-cutter.

An advantage of my invention resides in the fact that the cheap wheel variety of glass-cutter can be practicably utilized therein, as well as any other kind. However, the continual use of the wheel-cutter may quickly dull it, especially if the edges of oncoming pices of glass repeatedly hit it. A feature of my invention is, accordingly, a novel glass-cutter having self-lubricating means which permits only a limited amount of lubricating oil to reach the cutting wheel, enough to lubricate the wheel, but not enough to cause oil blotches on the glass being cut. A further feature of my invention resides in controlling the glass-cutter so that it engages a glass-pane and starts its cutting stroke just after the sharp oncoming edge of the glass-pane has passed it. Still another important feature of my invention is the pneumatic character of the force acting on the glass-cutter, the force being adjustable so that it can be increased as the glass-cutter becomes duller.

An element or subcombinational feature of my invention resides in the provision of a novel pneumatic operating valve and a control therefor, for controlling its operation.

Other novel features, objects, elements, and innovations of my invention will be discernible from the following description thereof which is to be taken in connection with the accompanying drawings.

The figures of the drawings, unless otherwise specified, are not to scale, and like numerals have been used thereon to refer to like or similar parts. In some figures, parts and details have been omitted for clarity of illustration.

In the drawings:

Fig. 6 is a sectional view of a pneumatic control-valve and pressing mechanism for controlling the operation of a glass-cutter;

Figure 1:
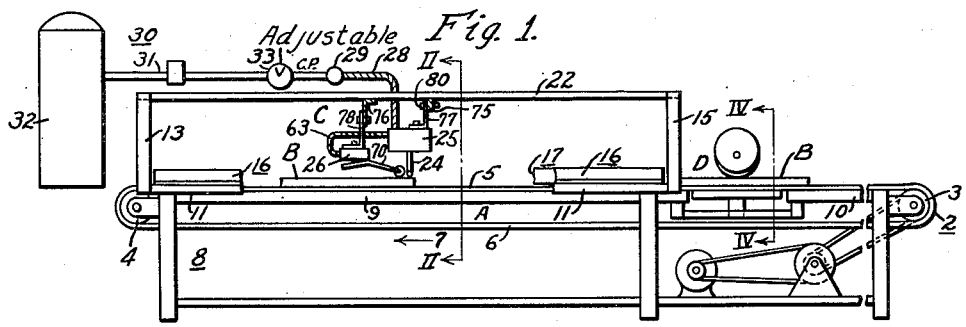
Figure 1 is a somewhat schematic, longitudinal, elevation view of an embodiment of my invention.

Figs. 7, 8, 9, and 10 are plan views of wood parts for making the pressing mechanism of Fig. 6; and Figs. 11 and 12 are longitudinal and transverse elevational views, respectively, of another form of glass-cutter.

In general, all forms of the automatic embodiment of my invention for scoring comprise a glass-conveying means A for successively transporting a plurality of the glass-panes B, in a predetermined path past an adjustable glass-cutting or scoring means C operable for putting cuts in the passing glass-panes.

A glass-conveying means A is shown in a simplified manner in the drawings as comprising an endless belt 2, of canvas webbing, wrapped around a rotatable driving drum 3 and a rotatory return drum 4. The belt 2 includes an upper substantially horizontal work-carrying stretch or run 5, kept in tension during operation, and a lower run 6, adapted to travel in the direction of the arrow 7.

The belt 2 and drums 3 and 4 are carried by a stationary frame or table which also supports suitable bearings for the drums, and any other common appurtenances connected with a conveyor of the endless belt type. The table is indicated in its entirety by the reference numeral 8, and includes a flat force-resisting table-plate 9, a flat table-plate 10, spaced therefrom, and side frame-members 11 and 12 at the side edges of the table. The upper run 5 of the belt rides on the table-plates 9 and 10.

Figure 2:
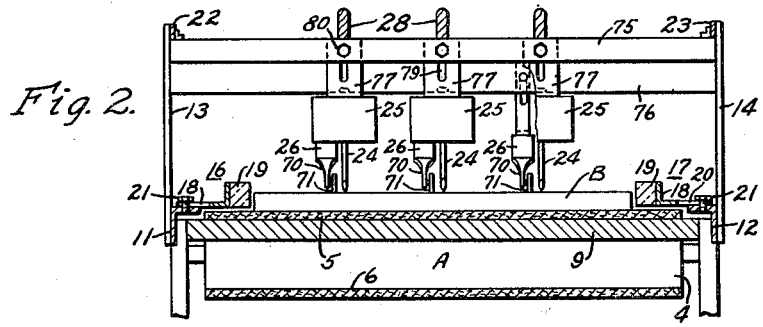
Fig. 2 is a transverse sectional view substantially on the line II—II of Fig. 1.

The table 8 further comprises a superstructure comprising a pair of upstanding corner posts 13 and 14 at the opposite corners of the forward or loading end of the table, and a pair of upstanding intermediate posts 15 at opposite side-edges of the table, between the cutting means C and a glass-fracturing means D. A pair of guide rails 16 and 17, extending between the upright posts on each side of the table, are secured to the side frame-members 11 and 12, being laterally adjustable and longitudinally spanning the glass-cutting means C. Each guide rail comprises an angular base bar 18 to which is secured an inner structural-glass face-bar 19 in a manner so as to extend inwardly of and slightly above the associated edge of the upper run 5 of the belt 2, as shown in Fig. 2. Each base bar 18 is provided with a plurality of laterally elongated holes 20 through which pass tightenable bolts 21 for tightening the guide rails in any adjusted position on the table, which is usually such that the distance between the face-bars 19 is just about the width of the glass-pane being conveyed on the belt, plus, of course, a slight clearance to prevent binding of the glass-panes with the face-bars 19. A clearance of about one-sixteenth of an inch has been found to be satisfactory in practice for cutting up the smaller panes of single thickness window glass of about 8 x 17 inches. The actual clearance may depend on the batch of glass being cut, but can easily be determined by experimentation, since the guide rails 16 and 17 are easily adjusted. In the preferred embodiment of my invention, the bars 19 are harder than the glass-panes being cut. If desired, one or both of the face-bars or the guide rails can be made in sections and each yieldably spring-pressed sidewise for lateral displacement so as to automatically accommodate any over-wide glass-pane carried by the belt, but automatically returning to an adjusted position after such glass-pane has passed. In such case, the ends of the sections, which the pane first reaches, can be rounded to prevent binding.

The superstructure further comprises relatively high horizontal side bars 22 and 23 secured, adjustably or otherwise, to the corner and intermediate posts at a proper distance above the belt 2. The height of the elements of the specific glass-cutting means C is a consideration for this distance, as will be later apparent.

The specific glass-cutting means C automatically scores one or more substantially straight lines in a glass-pane during a single trip of the pane on the belt-conveyor. Preferably, it comprises one or more glass-cutters 24, here shown as wheel-type, a pressing mechanism for each glass-cutter, for pressing or forcing the associated glass-cutter against a glass-pane for scoring it, and an operating device or control for each cutter-pressing mechanism. In a preferred form of cutter-pressing mechanism, means is provided for supporting the glass-cutter and for guiding the movement of the glass-cutter as it moves from a non-glass-cutting position to a glass-cutting position. This form is completely pneumatic, and is indicated in its entirety by the reference numeral 25, and its operating or control device is indicated by the reference numeral 26.

Figure 3:
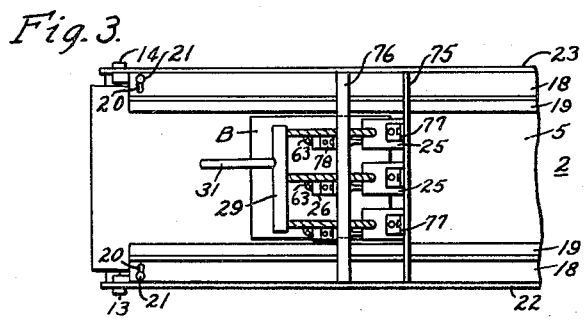
Fig. 3 is a fragmentary plan view of Fig. 1.
Figure 4:
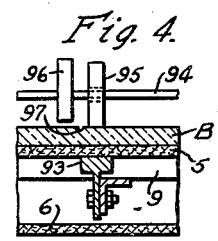
Fig. 4 is a partial transverse sectional view substantially on the line IV—IV of Fig. 1.

With special reference to Figs. 1, 3 and 6, each pneumatic cutter-pressing mechanism 25 comprises a block having an inlet branch passage 27 passing through its top surface, which is gas-tightly connected by any suitable, preferably flexible, hose 28 to a hollow distributing manifold 29. The manifold 29 is supplied with air from an air-supply system 30, herein comprising, for simplicity, a connecting pipe 31, a gas-tank 32, and any common or suitable means for keeping the air pressure supplied to the manifold 29 practically constant at any adjusted utilizable value. Adjustable means 33 for maintaining the pressure constant at different pressure-values can comprise any suitable or common equipment, and is indicated in the conventional manner in Fig. 1.

The inlet passage 27 terminates at a round, narrow valve-chamber 34. Starting at the valve-chamber 34 is a connecting passage 35 through which air under pressure, admitted to the valve-chamber 34, passes to a round power-chamber 36. The power-chamber 36 comprises an upper compartment 37 and a lower compartment 38, completely separated by a flexible diaphragm 39 of leather or any other suitable generally gas-impervious flexible or resilient material. A wheel-type glass-cutter 24 is supported by the diaphragm 39. To this end, a small thin metal plate 40 is centrally secured to the diaphragm, and the glass-cutter 24, comprising a shaft 41, depends from the plate 40, being screwed or otherwise fastened thereto. The shaft 41 passes through a guide bearing 42 which is adjustably screwed into a central threaded hole 43 in the bottom wall 44 of the cutter-pressing mechanism 25. The bottom wall 44 also includes holes or vents 45 which keep the lower compartment 38 at atmospheric pressure. A weak spring 46, around the upper part of the shaft 41, between the plate 40 and an annular disc 47, on the top of the guide bearing 42, tends to flex the diaphragm 39 upwardly.

The passage of air above atmospheric pressure through the valve-chamber 34 is controlled by a valve 48 comprising an upper cylinder 49, the top of which is seatable on an upper valve seat 50 at the termination of the inlet passage 27, and the bottom of which is seatable on a lower valve seat 51. A stem 52 depends from the cylinder 49, passing through a somewhat larger guide hole 53 extending from the valve seat 51. The stem 52 protrudes into an upper compartment 54 of a valve-operating chamber 55 which also has a lower control compartment 56. These compartments are formed by a movable member in the form of a flexible leather diaphragm 57 which separates the compartments and has a central stiffening member 58 which can engage the bottom of the stem 52.

The upper compartment 54 is maintained at atmospheric pressure by a branch vent passage 59. The lower compartment 56 is connected to the inlet passage 27 through a narrow bleed-passage 60 controlled by an adjustable bleeding valve 61, so that the air under pressure from the inlet 27 can pass through the bleed-passage 60 at a controlled slow rate which is less than that at which air under pressure can flow out of the lower compartment 56 when an outlet or release passage 62 therefor is opened to atmosphere. The underneath area of the diaphragm 57, which is exposed in the lower compartment 56, is greater than the top area of the cylinder 49 of the valve 48, which can be acted upon by air under pressure from the inlet 27.

The release passage 62 is connected through a flexible hose 63 to the control device 26 which includes a control valve 64. The control valve 64 comprises a hollow chamber 65 in free communication with the hollow passage of the hose 63. The chamber 65 has a bottom 66 provided with a hole or opening 67 which is gas-tightly closed by a movable closure 68. The closure 68 comprises a valve-closing portion including a peripheral gasket 69 and a downwardly protruding arm 70 rotatably supporting, at its extreme end, a small roller 71. The arm 70 and the roller 71 are in the nature of a valve-actuator for the valve 64. A pair of threaded rods 72, fastened to the bottom 66 on each side of the hole 67, pass through over-size holes in the closure 68. Nuts 73, adjustable on the free ends of the rods 72, compress springs 74 which force the closure 68 to closing position gainst any working air pressure that might exist in the chamber 65.

In normal position, with no glass-plane under the roller 71, the valve 64 is closed and air under pressure is in the compartment 56, being supplied from the inlet 27 through the bleed-passage 60. The area of the diaphragm 57 being greater than that of the cylinder 49, the differential force on the valve 48 forces it against the upper valve seat 50, so that the supply of air under pressure to the connecting passage 35 is shut off. In raised position of the valve 48, the upper compartment 37 of the power-chamber 36 is exposed to atmosphere via the passage 35, the valve-chamber 34 in which the valve 48 is in uppermost position, the clearance between the stem 52 and hole 53, the upper compartment 54 of the chamber 55, and the open vent-pasage 59. Accordingly, in stand-by condition of the cutter-pressing mechanism atmospheric pressure acts on both sides of the diaphragm 39 so that it is flexed upwardly by the spring 46, thereby putting the tool attached to it, namely, the glass-cutter 24, in up position. A stop or some equivalent expedient may be provided to determine the uppermost position of the glass-cutter when the diaphragm 39 is forced upwardly solely by the spring 46, although the diaphragm itself has a maximum upward displacement.

A plurality of cutter-pressing mechanisms 25 and control devices 26 therefor are supported in spaced relation by the table 8, for automatically scoring lines in a glass-pane B passing thereunder. In one form of my invention, shown in Figs. 1 to 3, a transverse bar 75 and a transverse angle 76, secured to the side bars 22 and 23, support the cutter-pressing mechanisms 25 and the control devices 26, respectively. The support is such that the position of each mechanism 25 can be vertically individually adjusted, and the position of each control device 26 can be individually adjusted vertically and also longitudinally, that is, in a direction along the length of the endless belt 2. Any suitable means can be used for such purposes, and I have shown, for simplicity, a form comprising a slotted angle bracket 77 for each cutter-pressing mechanism 25, and a slotted angle bracket 78 for each control device 26.

Each bracket 77 has a horizontal leg which is bolted or otherwise secured to the top of the associated cutter-pressing mechanim 25, and a vertical leg which is provided with an elongated slot 79 so that the associated mechanism 25 can be adjustably positioned by means of bolts 80, and associated end-nuts in an obvious manner. Similarly, the horizontal leg and the vertical leg of each bracket 78 are each provided with an elongated slot to permit the adjustments of the position of the control device 26 in the two directions mentioned.

The mechanisms 25 are positioned so that the axes of the wheels of the glass-cutters are substantially perpendicular to the direction of movement of the glass-panes to be scored, and so that the glass-cutters, in their up, non-scoring positions, are a distance above the belt 2 which is only slightly more than the thickness of the glass-panes to be scored, allowing for irregularities in the glass and conveyor-means. Each control device is positioned with the axis of its roller 71 substantially parallel to that of the wheel of the associated glass-cutter, and close to the cutter, but on the glass-feeding side; the arrow 91 in Fig. 6 indicating the direction in which the glass-panes move with respect to the roller 71 and glass-cutter 24 when approaching them for scoring. The control devices are positioned so that the rollers 71 are a distance above the belt 2 which is slightly less than the thickness of the glass-panes to be scored, also allowing for irregularities.

Figure 5:
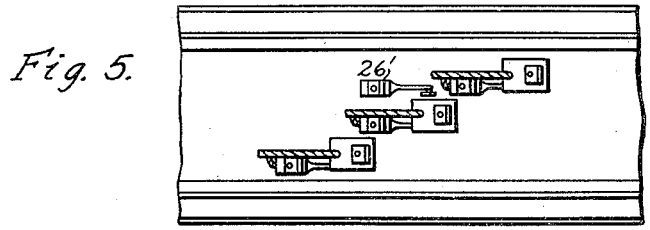
Fig. 5 is a fragmentary plan view of another embodiment of my invention.

As many cutter-pressing mechanisms are suitably supported over the belt 2 as there as lines to be scored in a passing glass-pane, within the capacity of a particular machine. In Fig. 1, I have shown three wheel-type glass-cutters, having rotatable cutter-wheels 90, supported in alignment across the table 8; but they can be staggered in some instances, as illustrated in Fig. 5.

In operation of the apparatus for glass-cutting, the upper part of the leading edge of a pane of glass, carried by the belt, approaching a control device 26, engages a roller 71, raising it against the action of the springs 74 and causing the closure 68 to pivot on the lower right corner 91 of the control valve 64. The chamber 65 is thereupon opened to atmosphere and air under pressure exhausts from the lower compartment 56 of the valve-operating chamber 55, through the hose 63. The bleed-valve 61 is adjusted so that the rate of air supplied through the bleed-passage 60 is less than that exhausting through the hose 63. The pressure in in the compartment 56 decreases rapidly to a low value, and the air pressure acting on the top of the valve 48 pushes it to its lower seat 51, closing off the vent 59 from the connecting passage 35, and permitting air under pressure from the inlet 27 to flow into the upper compartment 37. The diaphragm 39 is forced downwardly, pushing or pressing the glass-cutter attached to it downwardly so as to score the glass moving thereunder.

When the glass-pane has passed the roller 71, the springs 74 force the closure 68 upwardly, closing the chamber 65, and permitting the air pressure to build up in the lower compartment 56. The valve 48 moves upwardly and the sequence of operations, previously described, in connection with the cutter-pressing mechanism 25, for raising the glass-cutter 24, repeats.

I have found it desirable to provide a separate cutter-pressing mechanism 25 for each glass-cutter 24, and a separate control for each cutter-pressing mechanism. The horizontal or longitudinal adjustment of each control device permits it to be placed properly to take care of any lag in the operations required to press the glass-cutter down from the time the roller 71 is raised by an approaching piece of glass, and also to control the point on the glass-pane at which the glass-cutter starts to score. I have found it desirable to start cutting pressure on a wheel-type glass-cutter just after the extreme sharp edge of a glass-pane has passed it. This prolongs the life of the cutter-wheel, that is, its cutting edge does not dull as quickly. It is also desirable to feed cutting lubricant to the cutter-wheel, and an oiling hole 92 may be provided in the shaft 41 of the glass-cutters 24, for such purpose.

After being scored with the desired number of lines, the glass-panes may be discharged into any receiving receptacle for hand breaking, or for further scoring. In Fig. 1, I have shown a glass-fracturing means D as part of the glass-cutting apparatus. This means is, however, optional and may be omitted.

The glass-fracturing means D comprises a relatively narrow bar 93 extending lengthwise in the space between the table-plates 9 and 10. The upper run 5 of the somewhat flexible belt 2 rides on the bar which is so disposed that an edge of it will be substantially directed below a cut in the glass carried thereover. A shaft 94 is rotatably supported by the table 8, and has a concentrically loosely mounted roller 95 rotatable with respect to the shaft and an eccentrically mounted roller 96 keyed to the shaft. During rotation of the shaft 94, the roller 95 resiliently maintains a glass-pane against the bar 93, while the high part, or the part radially most outward, of the roller 96 taps or hammers the glass-pane in the side of a scored line 97 in the pane, which is opposite to that on which the roller 95 acts. Preferably, as many bars, such as bar 93, and as many fracturing mechanisms, such as the rollers 95 and 96, are provided as there are lines scored in each glass-pane by the associated glass-cutting means. Such bars should be longitudinally staggered.

In an application of my invention, illustrative of its advantages, two tables or machines, with associated glass-cutting appurtenances, were arranged at right-angles with one of them discharging into a skid for feeding the discharged panes to the other machine for crosswise scoring. Each machine had its wheel-type cross-cut window-glass glass-cutters laterally aligned, but was not provided with fracturing means, so that a single table-plate underneath its upper run was sufficient. These machines were used for cutting panes of 8 x 17 inches into 2 x 4¼ inch lights utilizable for welder's masks. The first machine had its guide rails adjusted to operably fit the eight inch width of the glass, and three glass-cutters simultaneously rectilinearly scored each glass-pane length-wise with cuts or score-lines spaced two inches part, the end score-lines being two inches from the lengthwise ends of the glass-pane. The partially scored panes were passed into the second machine, similar to the first, for simultaneously rectilinearly scoring lines in them at right-angles to the score-lines already in the pieces of glass, the second score-lines being spaced 4¼ inches.

The endless-belts of the machines operated at a linear speed of about 100 feet per minute and the manifold distributed air at a pressure of two inches of mercury to each cutter-pressing mechanism 25, which is shown to one-half scale in Fig. 6, when the glass-cutters were new. The machines cut the glass-panes as fast as they were manually fed to the apparatus; an ordinary output being 1700 panes of 8 x 17 inch single thickness window-glass scored lengthwise and crosswise in one hour. The time lag between a control movement of the closure 68 and a corresponding movement of the glass-cutter was only a fraction of a second in the specific application described herein. As the glass-cutters dulled the air pressure was slightly increased at intervals until the pressure was 4 inches at the time the glass-cutters were too dull for further use. The pneumatic pressure remained constant to within about ±⅛ of an inch, between adjustments which were in steps of about ¼ inch of mercury. The sets of glass-cutters were changed after cutting approximately two thousand linear feet of glass per glass-cutter.

Sometimes, and especially if the canvas of the belt 2 is smooth, there may be a tendency for the glass-panes to slip with respect to the belt 2 while being scored. This tendency may be overcome by adding one or more rollers, near the glass-cutters, pressed downwardly by springs or otherwise onto the passing glass-panes. An auxiliary device like the control device 26 shown in Fig. 6 is satisfactory, without, of course, the hose connections and with stronger springs. Such an auxiliary device is indicated at 26' in Fig. 5. In some cases, the control devices 26 are sufficient, but it may be desirable to limit the operation of the control devices to their primary function. In this connection the width of a control device 26 need only be sufficient to accommodate the stub pipe 99 which receives the hose 63.

The pneumatic cutter-pressing mechanism 25 can be made of any suitable material and in suitable manner. The mechanism of Fig. 6 has been designed to avoid the use of strategic materials, being built from blocks of wood 100, 101, 102 and 103, bolted together and fashioned along the lines shown in Figs. 6 to 10. Figs. 7 to 10 are to one-third scale. The block 100 is the top part, the block 101 is the next lower, and the block 102 is adjacent to the bottom block 103. This structure has the advantage of permitting the diaphragms 39 and 57 to be placed in proper position between blocks 102 and 103, and blocks 101 and 102 respectively, and the proper assembly of the other internal parts, prior to the bolting of the blocks together by the four corner through-bolts 104.

In Figs. 11 and 12 I show an improved form of glass-cutter device for increasing the life of the cutter-wheel. The shank 41' is slidable in the guide bearing 42, and terminates in a horizontal arm 105 provided with a vertical arm 106. A cutter-wheel 90' is suitably rotatably supported in a somewhat larger groove in the bottom of the arm 106. For oiling the cutter-wheel, a capillary hole 107 passes through the arm 106, having a discharge end above the wheel-cutter 90'. A vessel or container 108 has a filling neck 109. The vessel containing the cutting lubricant is attached, in inverted position, to the top of arm 106 by means of a rubber or similar tube 110.

From my tests, it appears that the force with which the glass-cutter is pressed downwardly for cutting is important; and I prefer, at present, to provide sufficient means through which I can adjust this force until a satisfactory cut is obtained. Thus, the source of air pressure is preferably such as to keep a constant pressure in the manifold 29, but the air-supply system 30 includes any suitable means 33 for readily varying the level or value of the air pressure at which it is kept constant. The vertical adjustment of the pressing mechanism 25, through its supporting means, can be used to place the glass-cutter to any particular non-cutting up position. I have found that disposing the cutter-wheel about one thirty-second of an inch above a glass-pane provides a satisfactory non-cutting position for the cutting of 8 x 17 inch window-glass, as previously described.

Up to the present, I have found pneumatic operation of the glass-cutters to be better than other forms of applying a cutting force to a cutter-wheel, such as electro-magnetic or purely mechanical devices. Although I may be mistaken, I believe that the better operation results because the glass-cutter is pressed down, in the pneumatic embodiment, by a force which is adjusted in accordance with the sharpness of the glass-cutter, but which is also yieldable, while cutting a pane of glass, so as to follow the movement of the glass-cutter during scoring without any appreciable or significant change. Such operation, I believe, produces an even and light cut in a pane of glass which may vary in thickness or flatness, or which is carried by an uneven belt, because the force pressing on the glass-cutter remains substantially constant for a cut while the glass-cutter follows the contour of the surface being scored.

I claim as my invention:

1. Glass-cutting mechanism comprising a glass-cutter, a flexible diaphragm, means for connecting said glass-cutter to said diaphragm for movement therewith, force-means operative for flexing said diaphragm in a direction for moving said glass-cutter to non-glass-cutting position, a chamber for said diaphragm, said chamber comprising a wall-means comprising a guide bearing for said glass-cutter, means providing a passage to said chamber for gas under pressure, for acting on said diaphragm in opposition to said force-means, an automatic valve means constructed and arranged to control said passage, said valve means having a first side exposable to gas pressure in said passage, a restricted connecting passage from said gas-pressure passage to the second side of said valve means, a passage means to said second side of said valve means, said passage means having a control valve operable to expose said passage means to atmosphere, and means responsive to an externally applied force for controlling the operation of said control valve.

2. Glass-cutting mechanism comprising a glass-cutter, a flexible diaphragm, means connecting said glass-cutter to said diaphragm for movement therewith, force-means operative for flexing said diaphragm in a direction for moving said glass-cutter from glass-cutting position, a chamber for said diaphragm, means providing a passage to said chamber for gas under pressure, for acting on said diaphragm in opposition to said force-means, a valve-means controlling said passage, said valve-means being pneumatically operated, and means responsive to an externally applied force for controlling the pneumatic operation of said valve-means, the last said means comprising a valve-operating chamber, a hose connection from said valve means to said valve-operating chamber, a movable member associable with said valve-operating chamber movable to a position exposing said valve-operating chamber to ambient atmosphere, a roller adapted to be engaged by a moving piece of glass, and a connection between said roller and the last said movable member.

3. Glass-cutting mechanism for scoring glass, comprising the combination of a glass-cutter, a hollow chamber, a member dividing said chamber into a pair of compartments, a first of said compartments being open to atmospheric pressure, a portion of said member being movable back and forth, biasing means biasing said portion toward the second of said compartments, said portion having means securing said glass-cutter thereto on a side away from said second compartment, means providing a gas-passage to said second compartment, means providing a first branch passage to said gas-passage for gas under pressure, means providing a second branch passage to said gas-passage open to atmospheric pressure, means comprising a valve for selectively connecting said gas-passage to said first or said second branch passage, said valve having a first side exposed to gas in said first branch passage, a control for said valve comprising a control compartment having a movable member at a second side of said valve, said control comprising a bleeding passage from said first branch passage to said control compartment for applying gas under pressure to said movable member whereby to move said valve to a position connecting said second branch passage to said gas-passage, and a control mechanism comprising a pipe connected to said control compartment, said control mechanism comprising a closure movable to open said control compartment to atmospheric pressure, said pipe being less restrictive to gas-flow than said bleeding passage.

4. An invention including that of claim 3 but characterized further by said closure having operating means comprising a resiliently-mounted rotatable wheel adapted to ride on a glass pane to be scored.

5. An invention including that of claim 3 but characterzied further by said bleeding passage having an adjustable valve for controlling the rate of bleeding.

6. An invention including the further combination with the invention of claim 3, of a supply of gas under pressure, connected to said gas-passage, said supply having pressure controlling means adjustable for increasing the gas-pressure in said gas-passage.

7. Operating means of a type described comprising a hollow power chamber, a member completely across said chamber providing a compartment therein, a side of said member having a face facing away from said compartment, said face being open to atmospheric pressure, a portion of said member being movable back and forth, biasing means continuously biasing said portion toward said compartment, means providing a gas-passage to said compartment, means providing a first branch passage to said gas-passage for gas under pressure, means providing a second branch passage to said gas-passage open to atmospheric pressure, means comprising a valve for selectively connecting said gas-passage to said first or said second branch passage, said valve having a first side exposed to gas in said first branch passage, a control for said valve comprising a control compartment having a movable member at a second side of said valve, said control comprising a bleeding passage from said first branch passage to said control compartment for applying gas under pressure to said movable member, whereby to move said valve to a position connecting said second branch passage to said gas-passage, and a control device for selectively applying ambient atmospheric pressure to and closing off ambient atmosphere pressure from said movable member.

8. An invention including that of claim 7 but characterized further by said bleeding passage having an adjustable valve for controlling the rate of bleeding.

9. A glass-cutting machine suitable for automatically scoring glass with a wheel-type glass-cutter, the combination of means providing a predetermined path for the movement of a glass-pane, said means comprising a table-member, means for supporting a glass-cutter above and spaced from said table-member, said supporting means comprising a chamber, said chamber comprising wall-means having a guide bearing for said glass-cutter, a member dividing said chamber into an upper and a lower compartment, a portion of said member being movable back and forth in said chamber, means dependingly securing said glass-cutter to said portion, said wall means having an opening exposing said lower compartment to ambient atmospheric pressure, means biasing said portion upwardly, passage-means to said upper compartment of said chamber providing a first passage for a gas under pressure, and a second passage to ambient atmosphere, a valve means operable to a first position connecting said upper compartment to said first passage or to a second position connecting said upper compartment to said second passage, and a control device having a connection to said valve means and operable on said valve means to place said valve means in said second position, said control device including operating means operable thereon to cause it to move said valve means from said second position to said first position.

10. A machine as defined in claim 9 but further characterized by said operating means of said control device comprising an actuator member adapted to ride on a glass pane moving along said path.

11. A machine as defined in claim 10 but further characterized by said connection of said control device comprising an elongated hose.

12. Glass-cutting apparatus suitable for automatically scoring glass with a glass cutter, comprising, in combination, means providing a predetermined path for the movement of a piece of glass, said means comprising a force-resisting table-member, a pneumatically-operated cutter-pressing mechanism, a support supporting said cutter-pressing mechanism spaced from said table-member and path, said cutter-pressing mechanism comprising wall-means defining a chamber, a movable member in said chamber having a portion movable back and forth in opposite directions therein, said member dividing said chamber into a pair of compartments one on each side of said member, said cutter-pressing mechanism comprising a guide-bearing for a glass-cutter, said glass cutter being associated with said movable portion and movable therewith to either of two cutter-positions comprising a glass-cutting position and a non-glass-cutting position, operating means, comprising a pneumatic passage to one of said compartments, said operating means being operable for selectively operating said movable portion in said chamber in said directions, whereby to move said glass-cutter, said operating means comprising a control device comprising a valve controlling the operation of said operating means, a valve-actuator therefor at said path and operable by a piece of glass moving along said path, a flexible connection between said valve and said cutter-pressing mechanism, and as support for said valve.

13. Glass-cutting apparatus suitable for automatically scoring glass with a glass cutter, comprising, in combination, means providing a predetermined path for the movement of a piece of glass, said means comprising a force-resisting table-member, a pneumatically-operated cutter-pressing mechanism, a support supporting said cutter-pressing mechanism spaced from said table-member and path, said cutter-pressing mechanism comprising wall-means and a member carried by said wall-means to define a compartment, said member having a portion movable back and forth in opposite directions, said cutter-pressing mechanism comprising a guide-bearing for a glass-cutter, said glass-cutter being associated with said movable portion for movement with said movable portion to either of two cutter-positions comprising a glass-cutting position and a non-glass-cutting position, a first force-applying means associated with said portion for applying a bias to said portion to place said glass-cutter in a first of its said positions, a second force-applying means associated with said compartment and comprising passage means providing a first passage leading to said compartment effective for conveying a gas under pressure to said compartment to act on said movable portion to overcome said bias and place said glass-cutter in the second of its said position, and providing a second passage leading to said compartment effective for releasing gas from said compartment so that said bias acts on said movable portion to place said glass-cutter in its said first position, operating means operable for selectively making said first passage or said second passage effective as aforesaid, said operating means comprising a valve controlling the operation of said operating means, a valve-actuator therefor at said path and operable by a piece of glass moving along said path, and a hose connection between said valve and said cutter-pressing mechanism, said hose connection permitting said valve-actuator to be adjustably positioned with respect to said cutter-pressing mechanism.

LLOYD V. GUILD.

REFERENCES CITED

The following references are of record in the file of this patent:

UNITED STATES PATENTS

| Number | Name | Date |
|---|---|---|
| 515,293 | Miller | Feb. 20, 1894 |
| 986,753 | Plummer | Mar. 14, 1911 |
| 989,603 | Hornig | Apr. 18, 1911 |
| 1,102,843 | Woodward | July 7, 1914 |
| 1,124,784 | Monro | Jan. 12, 1915 |
| 1,259,687 | Waterloo | Mar. 19, 1918 |
| 1,352,263 | Harding | Sept. 7, 1920 |
| 1,755,365 | Rowley | Apr. 22, 1930 |
| 1,970,932 | Drake | Aug. 21, 1930 |
| 1,876,612 | Chiotti | Sept. 13, 1932 |
| 1,893,658 | Slocombe | Jan. 10, 1933 |
| 1,898,647 | Teuscher | Feb. 21, 1933 |
| 1,970,930 | Brasseur et al. | Aug. 21, 1934 |
| 1,972,210 | Waldron | Sept. 4, 1934 |
| 2,042,819 | Allison | June 2, 1936 |
| 2,157,367 | Warner et al. | May 9, 1939 |
| 2,197,560 | Moller | Apr. 16, 1940 |
| 2,278,273 | Limbers | Mar. 31, 1942 |
| 2,356,877 | Oakes | Aug. 29, 1944 |
| 2,361,049 | Oakes | Oct. 24, 1944 |